United States Patent [19]

Willson

[11] Patent Number: 5,000,481

[45] Date of Patent: Mar. 19, 1991

[54] LOCKING DEVICE FOR VEHICLE SEAT BELTS

[75] Inventor: Howard S. Willson, Ann Arbor, Mich.

[73] Assignee: Chrysler Corporation, Highland Park, Mich.

[21] Appl. No.: 451,855

[22] Filed: Dec. 18, 1989

[51] Int. Cl.$^5$ .............................................. A47C 31/00
[52] U.S. Cl. .................................... 280/808; 24/170; 297/483
[58] Field of Search ............... 280/801, 802, 806, 808; 297/468, 473, 483; 24/170, 513, 516, 517

[56] References Cited

U.S. PATENT DOCUMENTS

| | | | |
|---|---|---|---|
| 632,793 | 9/1899 | Sell et al. | 24/170 |
| 715,495 | 12/1902 | Merrill et al. | 24/517 |
| 3,480,325 | 11/1929 | Kramer | 24/170 |
| 3,713,693 | 1/1973 | Cadiou | 297/389 |
| 4,725,076 | 2/1988 | Taylor | 280/808 |
| 4,786,078 | 11/1988 | Schreier et al. | 280/808 |
| 4,796,919 | 1/1989 | Linden | 280/808 |
| 4,799,737 | 1/1989 | Greene | 280/808 |
| 4,826,250 | 5/1989 | Ibanez | 297/483 |
| 4,832,367 | 5/1989 | Lisenby | 280/808 |
| 4,893,835 | 1/1990 | Linden | 280/808 |
| 4,912,818 | 4/1990 | Meeker | 24/170 |
| 4,946,198 | 8/1990 | Pittore et al. | 280/808 |

Primary Examiner—Richard A. Bertsch
Attorney, Agent, or Firm—Kenneth H. MacLean

[57] ABSTRACT

This seat belt locking device is utilized to temporarily modify a shoulder/lap belt occupant restraint system in a vehicle to secure a child's restraint seat in place in the vehicle. The clamp has a base on which overlapping shoulder and lap belt webbings are placed on a locking bar pivoted to the base is used to force the overlapping webbing to an offset, high friction position. A camming and retaining knob is turned over the free camming end of the clamping bar to further tension the lap belt webbing and to secure the bar and the webbing offset thereby in position so that the lap belt can be effectively employed to keep the child restraint seat in position under a wide range of seat belt loads as encountered during normal driving conditions.

3 Claims, 1 Drawing Sheet

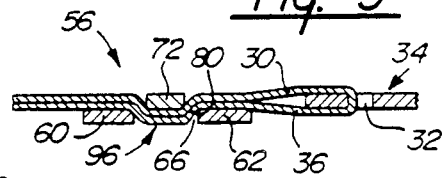
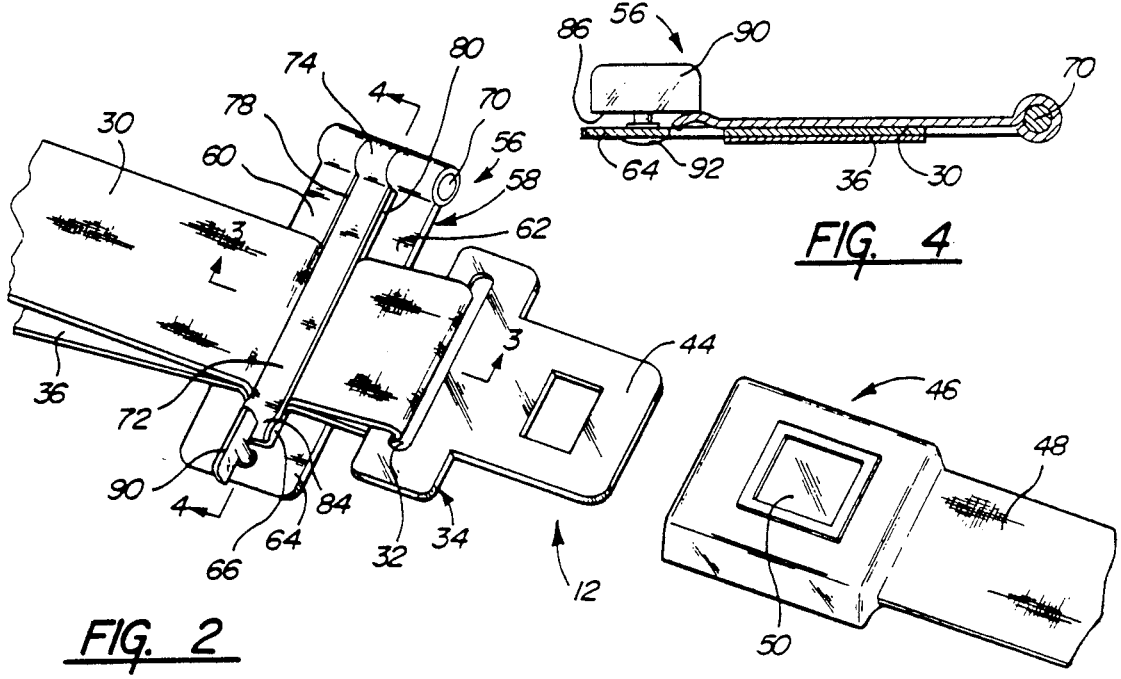

LOCKING DEVICE FOR VEHICLE SEAT BELTS

TECHNICAL FIELD

This invention relates to a device for locking an automobile seat belt and more particularly to a new and improved device for interconnecting shoulder belt webbing to lap belt webbing at a selected position adjacent to a seat buckle latch plate so as to tension and fix the lap belt length so that the lap belt effectiveness is optimized for tightly securing a child restraint seat in an automotive vehicle during normal vehicle stopping and turning operations. Belt restraint during emergency stopping or maneuvering is provided by the inertia locking device or retractor of the seat belt system which is provided for extreme situations such as impacts.

BACKGROUND OF THE INVENTION

Prior to the present invention, lap/shoulder safety belts have been utilized in automotive vehicles to restrain the movement of a passenger from a seated position which might result from turning and/or braking of the vehicle. Generally, such lap/shoulder belt systems have a shoulder portion attached at one end to an inertia locking wind-up reel fixed within the vehicle and an integral lap portion having its end fixed to an anchor plate attached to the vehicle at the lower door sill. The shoulder and lap portions are part of a continuous webbing looped through a slot in a belt buckle latch plate which presents little or no friction to the belt webbing thereby allowing the free transfer of belt webbing between the shoulder and lap portions for ease of adjustment to fit the wearer. The latch plate has a portion which can be placed into the belt buckle anchored to the vehicle to secure the shoulder and lap belts thereto so that the wearer is effectively restrained in the event of extreme situations such as an impact causing rapid vehicle deceleration.

While such lap/shoulder systems fully meet standards to restrain the wearer, an additional device is needed to hold a child restraining seat in position during normal driving maneuvers by minimizing the transfer of webbing between the lap and shoulder portions. Prior to the present invention, this has been accomplished by a one piece clip having a centralized bar that connects parallel end pieces that have inwardly facing tangs at their extremities. The adjacent shoulder portion of the seat belt webbing is layered with the lap belt portion and is inserted in the clip so that the webbing layers extend over the bar and under the tangs to thereby frictionally interconnect these two belt areas and effectively fix or lock the length of the lap portion. While this prior clip inhibits the transfer of webbing between the shoulder and the lap portions, difficult manual manipulation of the belt webbing and clip are required inhibiting clip installation particularly after the belt has been snugly adjusted about the child restraint seat and locked in tension into the buckle. In the event that the belt is unbuckled to relieve the belt tension so that the clip can be installed with relative ease, it becomes very difficult to rebuckle the belt as foreshortened by the clip.

DISCLOSURE OF THE INVENTION

The present invention provides a new and improved locking device that can be utilized in place of the clip for quick and ready installation at any convenient position on layered lap and shoulder belt portions to more effectively anchor the latch plate end of the lap belt so that is cannot slide through the latch plate slot. Preferably, the locking device of this application is utilized after the child restraint seat has been positioned on the vehicle seat and the lap belt portion of the webbing has been appropriately tightened and connected to the anchored belt buckle. In one preferred embodiment of the invention, the locking device of this invention once properly installed, offsets a portion of the overlapped webbing with belt tensioning and camming construction that frictionally connects the webbing sections together. The clamp is preferably installed by positioning a base portion under overlapping layers of lap and shoulder webbing and then by rotating the hinged top bar of the clamp over the webbing to offset a portion of the webbing by the lever action of the bar and finally, by turning a camming knob so that it moves and retains the hinged top bar into even tighter engagement with the webbing. With this clamp action, the seat belt webbing is easily and tightly installed about the child's restraint seat and the belt tension is maintained to better secure the restraint seat in a fixed position during normal driving maneuvers.

It is a feature object and advantage of this invention to provide a new and improved vehicle seat belt locking device for frictionally interconnecting shoulder and lap belt webbing so that the lap belt webbing is tensioned and fixed in length preferably after it is installed around a child restraint seat so that the restraint seat with a child seated therein is held in place in the event of sudden motion of the vehicle These and other features, objects and advantages of the present invention will be more apparent from the following detailed description and drawing in which:

DESCRIPTION OF THE DRAWINGS

FIG. 1 is a pictorial view of a child restraint seat held in position on a seat in a vehicle by the webbing of a shoulder/lap belt system using the seat belt locking device of this invention.

FIG. 2 is an enlarged view of a portion of the webbing of FIG. 1 showing the locking device utilized to hold the webbing in position.

FIG. 3 is a sectional view taken generally along lines 3—3 of FIG. 2.

FIG. 4 is a view partly in section taken on lines 4—4 of FIG. 2.

DETAILED DESCRIPTION OF THE DRAWINGS

Turning now in greater detail to the drawing, there is shown in FIG. 1, a child seated in a restraint seat 10 that is tightly secured by an occupant restraint belt system 12 on a passenger seat 14 of an automobile of which only a portion 16 of the interior is shown.

The restraint belt system 12 conventionally designed for a larger statured occupant than the seated child, comprises a unitized lap/shoulder belt 18 with one end of the belt webbing 20 wound on and anchored by a conventional inertia locking reel 22 operatively mounted in the vehicle door sill 24. From the reel 22, the webbing 20 routes upwardly and slides through a slot in an upper junction plate 26 secured by fastener 28 to the vehicle body work 29. From the junction plate slot, the webbing extends as a shoulder belt 30 downwardly and slidably loops through a slot 32 in a latch plate 34. As a lap belt 36, the webbing continues from the sliding loop in the latch plate and terminates in a looped connection extending through a slot 39 in an anchor plate 40 secured by fastener means 42 to the floor of the vehicle.

As shown in FIG. 2, the latch plate 34 has an extending portion or tongue 44 that can be manually inserted into a receiving slot of a conventional buckle 46 for automatic locking thereto as is well known in this art. The buckle is secured by webbing 48 to an anchor plate fastened to the floor of the vehicle. The buckle includes a release mechanism which is actuated by the manual depression of a button 50 so that the latch plate and the shoulder and seat webbing can be detached from the buckle and the user can remove the restraint belts from his body.

To improve the use of the belt system and temporarily modify it to hold the child restraint seat 10 in position on the vehicle seat during vehicle turns and stops, it is necessary to prevent the free-sliding movement between the shoulder and lap webbing through the latch plate slot 32 so that the seat 10 is anchored in place with the lap belt webbing. This is effectively accomplished by a locking device 56 preferably employed adjacent to the latch plate to securely fasten the shoulder webbing to the lap belt webbing.

In a preferred embodiment, the locking device has a flat bifurcated base plate 58 which has a pair of fixed arms 60, 62 that extend in spaced and parallel relationship from a connector end 64 to define a rectilinear slot 66 for receiving shoulder and lap belt webbing. The free ends of arms 60, 62 are barreled for receiving a pivot pin 70. A centralized and rectilinear locking arm 72 is pivotally connected by an end barrel 74 and is dimensioned to fit with side clearances at 78, 80 into rectilinear slot 66. The free end of the locking arm 72 is coined at 84 to provide a camming surface which cooperates with the bottom surface 86 of a flat locking knob 90 that extends radially from a headed mounting post 92 pivoted to the connector end 64 of the base plate.

For installation, the restraint seat 10 is positioned on the vehicle passenger seat 14 and the shoulder and lap belt webbing is routed as illustrated across a rearward portion of the frame of the restraint seat that is designed to accommodate the seat belt system. After the seat belt has been adjusted to take up slack in the webbing and the latch plate is inserted into the buckle for automatic securement thereto. The locking device 56, with locking arm 72 raised to an open position, is positioned so that the base arms are immediately under the lap and shoulder belt webbing and the locking arm is then swung from its upward position so that it lies over the webbing. As the arm 72 is manually moved downwardly into the slot 66, the lap and shoulder belt webbing is easily forced by leverage provided by arm 72 into the slot and offset with respect to the planes of these webbings. By turning the locking knob into axial alignment with the arm 72, the camming surface on the end of the locking arm forces the webbing further into the offset position shown in FIG. 4. With this offset the lap and shoulder belts are held intimately together so that the lap belt length is fixed and tensioned so that the child restraint seat is secured in position to accommodate any loads which may be encountered in the event of sudden vehicle stopping or turning motions to thereby hold the seat and the child occupant safely therein.

While a preferred embodiment of the invention has been shown and described, other embodiments will now become apparent to those skilled in the art. Accordingly, the invention is defined by the claims which cover the preferred and other embodiments.

I claim:

1. A locking device for use on a vehicle seat belt system for restraining the movement of a child's restraint seat therein in response to sudden deceleration of a vehicle such as in normal backing and turning, said seat belt system having restraining belt webbing secured at one end to first anchor and at an opposite end to a second anchor, and having a latch plate with an opening through which said webbing slides to define a shoulder portion and a lap portion, said locking device comprising:

a base portion for receiving said shoulder and lap portion in a position adjacent to said latch plate, an upper locking portion operatively secured to said base portion and movable to an offset position to frictionally engage adjacent portions of said webbing therebetween, and locking means on said base portion and selectively movable into engagement with the free end of said upper locking portion for securely locking said upper locking portion in position to engage said shoulder and lap belts together with a high friction load.

2. A locking device for selectively and temporarily modifying a vehicle occupant seat belt system into a restraint belt for a child's safety seat positioned in a seat for an occupant in a vehicle, said seat belt system including integral shoulder and lap belt webbing extending from first and second anchor points in the vehicle and slidable through a juncture in a latch plate that is selectively attachable to an anchored seat belt buckle, said locking device comprising:

a base plate having an end portion and a pair of laterally spaced arms extending therefrom to free ends and defining a slot therebetween, a locking bar, pivot means pivotally mounting said locking bar to the free ends of said spaced arms, fastening means for holding said locking bar in position between said arms subsequent to the insertion of overlapped portions of said lap and shoulder webbing adjacent t said latch plate to effect an offset of said shoulder and lap belt webbing into said slot from the normal plane thereof so that lap belt length is frictionally fixed for embracing and anchoring said child restraint seat in position on the passenger's seat on the vehicle.

3. A locking device for selectively and temporarily modifying a vehicle occupant seat belt system into a restraint belt for embracing and securing a child's restraint seat positioned on a passenger seat in a vehicle, said seat belt system including integral shoulder and lap belt webbing extending from first and second anchor points in the vehicle and slidable through a juncture in a latch plate that is selectively attachable to an anchored seat belt buckle of the system, said locking device comprising:

a base plate having an end portion and a pair of laterally spaced arms extending therefrom to terminal free ends and defining a slot therebetween, an elongated locking bar having an attachment end and a free end, pivot means pivotally operatively connecting said attachment and of locking bar to the free ends of said spaced arms so that said locking bar aligns with said slot to allow said locking bar to be manually turned in one direction to open said locking device in order that overlapping portions of shoulder and lap belt webbing be run in a line directly across said arms and said slot, said free end of said locking bar providing a manual contact surface for turning said locking bar in an opposite direction and into contact with an underlying part of said shoulder and lap belt webbing t force said underlying part into said slot to thereby form an offset in the run of said shoulder and lap belt webbing, and anchor means pivoted to said base plate and cooperating with said surface on the free end of said locking bar to provide camming means for moving and holding said locking bar in position in said slot and between said arms to thereby securely connect said lap webbing to said shoulder webbing and to tension said lap belt webbing for securing said restraint seat in position.

* * * * *